(12) United States Patent
Huckins

(10) Patent No.: US 7,765,316 B1
(45) Date of Patent: Jul. 27, 2010

(54) SCHEDULING THE UPLOADING OF INFORMATION FROM A CLIENT TO A SERVER

(75) Inventor: Jeffrey L. Huckins, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 3155 days.

(21) Appl. No.: 09/686,754

(22) Filed: Oct. 10, 2000

(51) Int. Cl.
*G06F 15/16* (2006.01)
(52) U.S. Cl. .................. 709/232; 709/217; 709/203; 709/250
(58) Field of Classification Search ......... 709/203–205, 709/250, 232, 217
See application file for complete search history.

(56) References Cited

U.S. PATENT DOCUMENTS

| | | | | |
|---|---|---|---|---|
| 5,558,339 A * | 9/1996 | Perlman | ................. | 463/42 |
| 5,727,156 A * | 3/1998 | Herr-Hoyman et al. | ..... | 709/219 |
| 5,822,569 A * | 10/1998 | McPartlan et al. | ............ | 703/21 |
| 5,892,912 A | 4/1999 | Suzuki et al. | | |
| 5,978,845 A | 11/1999 | Reisacher | | |
| 6,021,439 A * | 2/2000 | Turek et al. | ................. | 709/224 |
| 6,058,399 A | 5/2000 | Morag et al. | | |
| 6,078,954 A * | 6/2000 | Lakey et al. | ................. | 709/223 |
| 6,085,243 A * | 7/2000 | Fletcher et al. | ............ | 709/224 |
| 6,119,158 A * | 9/2000 | Kawagoe | .................... | 709/223 |
| 6,330,719 B1 * | 12/2001 | Zigmond et al. | ............ | 725/121 |
| 6,389,473 B1 * | 5/2002 | Carmel et al. | ............... | 709/231 |
| 6,424,993 B1 * | 7/2002 | Weber | ........................ | 709/203 |
| 6,489,980 B1 * | 12/2002 | Scott et al. | ................... | 345/854 |
| 6,539,540 B1 * | 3/2003 | Noy et al. | .................... | 717/141 |
| 6,560,604 B1 * | 5/2003 | Fascenda | ..................... | 707/10 |
| 6,564,380 B1 * | 5/2003 | Murphy | ........................ | 725/86 |
| 6,614,804 B1 * | 9/2003 | McFadden et al. | .......... | 370/468 |
| 6,625,813 B1 * | 9/2003 | Gibbs | .......................... | 725/109 |
| 6,658,465 B1 * | 12/2003 | Touboul | ..................... | 709/223 |

FOREIGN PATENT DOCUMENTS

| JP | 10-242962 | 9/1998 |
|---|---|---|
| JP | 2000-134203 | 5/2000 |

OTHER PUBLICATIONS

Yano et al., Managing Cable TV Networks, p. 46-52, IEEE, 1999.*
Robinson et al. A MIB for Video Server Management, IEEE, 1995, pp. 109-115.*
Bhatti et al. On Management of CATV Full Service Networks: A European Perspective, 1998, p. 28-39.*

(Continued)

*Primary Examiner*—Larry Donaghue
(74) *Attorney, Agent, or Firm*—Trop, Pruner & Hu, P.C.

(57) ABSTRACT

A messaging system may enable a server to assign unique identifiers to a plurality of clients. These identifiers enable a client to determine whether a message is specifically targeted to that client or, as an alternative, whether the client is a member of a group of targeted clients. A server may send messages containing an identifier to agents on one or more clients. The identifier may specify commands to manage the uploading of information from one or more clients to a server.

4 Claims, 7 Drawing Sheets

OTHER PUBLICATIONS

Translation of Hein et al. ( Hein et al., SNMP, Simple Network Managemenf Protocol Version 2, 1st Edition, Bonn (et al,), Intl. z 74 Thomson Publishin GmbH, 1994, s. 339-340.*

Jeffrey L. Huckins, U.S. Appl. No. 09/652,168, filed Aug. 31, 2000, entitled Client Messaging in Multicast Networks.

Steven Louis et al., *Management Issues for High-Performance Storage Systems*, Proceedings of the 14th IEEE Symposium on Mass Storage Systems. Storage—At the Forefront of Information Infrastructures, Monterey, Sep. 11-14, 1995, Proceedings of the IEEE Symposium on Mass Storage Systems, Los Alamitos, IEEE Comp. Soc. Press, vol. SYMP. 14, Sep. 11, 1995, pp. 336-348.

S. Louis et al., *Management Issues for High-Performance Storage Systems*, IEEE 1995, pp. 336-348.

M. Hein et al., *SNMP, Simple Network Management Protocol Version 2*, 1st Edition, Bonn (et al.), Intl. Thomson Publishing GmbH, 1994, pp. 339-340.

*Technical Issue and Standardization in CATV Access Network*, Technical Report of the Institute of Electronics, Information and Communication Engineers (IN98-164), Feb. 15, 1999, vol. 98, No. 589, p. 57-64.

German Examination Report dated Feb. 21, 2008 issued in corresponding German Application No. 101 96 775.6-31, 6 pgs.

* cited by examiner

SCHEDULING THE UPLOADING OF INFORMATION FROM A CLIENT TO A SERVER

BACKGROUND

This invention relates generally to exchanging information in networks.

A multicast network may enable messages to be sent to a target group of clients that constitute a subset of all of the networked clients. Generally, multicasting is accomplished by including, within a header for example, the addresses of all the subject clients that are addressed.

A broadcast network operator may use a server or head end of a multicast network to control groups or individual broadcast receiver client platforms for the purposes of initiating network management sessions. These sessions may be for purposes of uploading network management information to the server of head end. This allows the network operator to manage the exchange of network management information in a very scalable fashion.

Thus, there is a need for ways to enable the exchange of information between clients and a server, head end or broadcast network operator.

DETAILED DESCRIPTION

Figure 1:
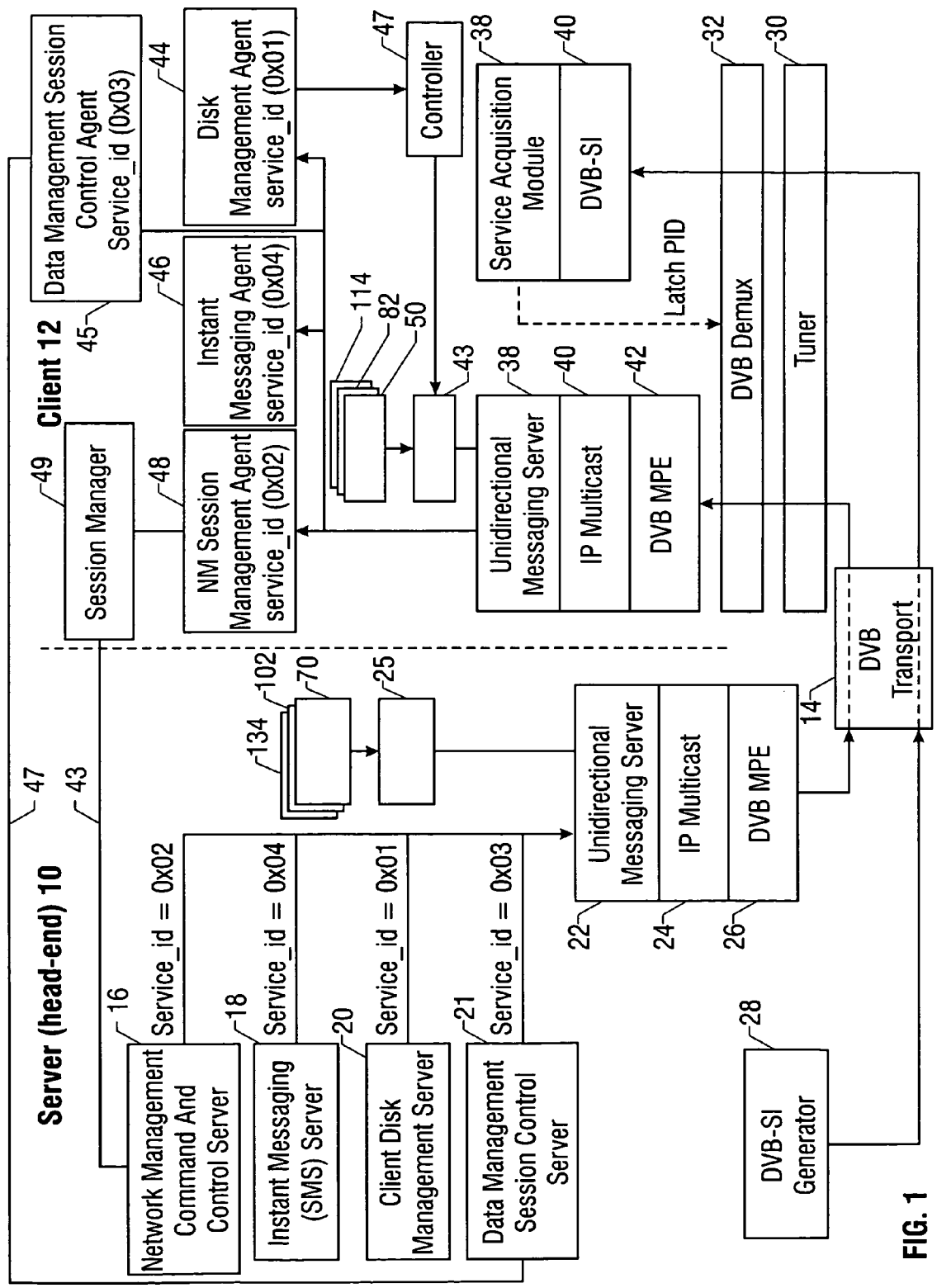
FIG. 1 is a schematic depiction of one embodiment of the present invention.

Referring to FIG. 1, a network may include at least one server, head-end or network operator 10 and a plurality of clients 12 (only one of which is shown). The server 10 may be coupled to a plurality of clients (including the client 12) through a distribution system that may be based on a wired system or a wireless or broadcast system. Examples of such networks include television distribution networks such as digital video broadcasting systems.

In one embodiment of the present invention, the server 10 may communicate with the clients 12 over a transport 14. The transport 14 may be in accordance with an analog or digital broadcasting system. As one example, the transport 14 may be compliant with the Digital Video Broadcast (DVB); Network-independent Protocol, ETS 300802, dated November 1997 and available from the European Telecommunications Standards Institute (ETS), Valbonne, France. The transport 14 may be a satellite, cable or airwave broadcasting system as examples.

In accordance with embodiments of the present invention, the client 12 recognizes messages directed individually to that client 12 from the server 10 or in some embodiments, from other clients 12. Bandwidth may be conserved by addressing messages to a group of clients without the need to insert, within header, the individual identifiers of each of a large number of addressed clients.

In addition, the client 12 may include one or more addressable agents 44, 45, 46 and 48 that may be independently addressed by remote units such as the server 10. Moreover, by providing addressable agents 44, 45, 46 and 48 within a given client 12, messages that are specialized or which need specialized handling may be addressed to particular agents resident on the client 12 for appropriate handling.

The server 10 may include a network management command and control server 16. The server 16 is responsible for managing the collection of data from clients 12. The server 16 transmits messages which include a distinct service identifier (e.g., service_id=0x02). The server 10 may also include an instant messaging or short message service (SMS) server 18 that also transmits messages having a distinct service identifier (e.g., service_id=0x04).

In addition, a client disk management server 20 may be provided as well. The client disk management server 20 may transmit messages that include one or more distinct service identifiers (e.g., service_id=0x01). In some cases, a variety of messages may be issued by the client disk management server 20 in order to initiate desired functions on a client's storage device or disk drive 43. For example, separate service identifiers may be utilized for the commands to create partitions, delete partitions, or modify partitions, as examples.

A data management session control server 21 may be responsible for handling the uploading of a data set that is uniquely identifiable on a client over an available return channel connection 47. This is a valuable capability that allows the network operator to manage the mining of data and the scalability of the associated servers. A unidirectional message service type and message identifier may be used for a data management session control (DMSC) to manage data management sessions for groups of clients or individual clients. This group management is inherently supported by a unidirectional messaging service by the strategic assignment of client identifiers for all broadcast receiver clients in the network that are managed by the server 10.

The data management session control server 21 transmits messages that include one or more distinct service identifiers (e.g., service_id=0x03). The server 21 creates a DMSC message data structure and passes information and data to the unidirectional messaging server 22 such as application-private data and data size, unique client identifier, a group flag which is a Boolean variable specifying if the client identifier is a group mask or individual client identifier, a service identifier value for the DMSC service and application-private message identifier.

In accordance with one embodiment of the present invention, the server 10 may implement a unidirectional messaging system. In a unidirectional messaging system, the server 10 may transmit messages to a plurality of clients that are unable to respond in any way. One example of such a network is a direct-to-home (DTH) broadcast network that may be compliant with the DVB protocol. The network may use a connection oriented communication protocol or a real time connectionless communication protocol as two examples. There are many applications of unidirectional messaging from server to client such as instant messaging, command and control and notification and signaling, as examples. In other cases, the network may be a bidirectional network, for example with an Internet Protocol (IP) multicast backbone.

In one embodiment of the invention, the server 10 may include a unidirectional messaging server (UMS) 22 that is coupled to the servers 16, 18, 20 and 21 to generate messages in an appropriate format. The messages transmitted by the UMS server 22 may include messages originally generated by one of the servers 16, 18, 20 or 21. The UMS server 22 may then be coupled to an Internet Protocol multicast module 24 that places the messages in an appropriate multicast protocol format. Finally, a DVB Multiprotocol Encapsulation (MPE) 26 is coupled to the Internet protocol multicast module 24. The MPE is described in DVB Specification for Data Broadcasts (EN 301 192) and Specification for Service Information (SI) in DVB Systems (EN 300 468 V1.3.1 1998-02) both available from the ETS. The output of the DVB MPE 26 and a DVB-Service Information (SI) generator 28 are coupled to the transport 14. Service Information is digital data describing the delivery system, content and scheduling/timing of broadcast data streams.

In the client 12, the stream from the DVB-SI generator 28 is coupled to a DVB-SI receiver 40 and service acquisition module 38. The service acquisition module 38 extracts a program identifier (PID) and provides it to a DVB demultiplexer 32. A tuner 30 may tune the client 12 to the appropriate channel corresponding to the extracted program identifier.

The message from the DVB MPE 26 is provided to a DVB MPE receiver 42. The receiver 42 communicates with an IP multicast module 40 and a unidirectional messaging server 38. The server 38 breaks down the message to determine whether a service identifier was included in the data stream. If so, the message is forwarded to an appropriate agent designated to receive messages with particular service identifiers.

A disk management agent 44 may be coupled to a disk drive controller 47 in turn coupled to a storage device 43 that may, for example, be a hard disk drive. The disk management agent 44 may be addressed as a message recipient by the client disk management server 20. The disk management agent 44 may cause processes to be undertaken through the controller 47 that in turn control the use of the storage device 43. This control may include determining what information is stored on the storage device 43 and how that information is stored on the storage device 43.

In one embodiment of the present invention, the network management command and control server 16 may provide a specific message identifier that causes its message to be received by a network management session management agent 48 tuned to a particular service identifier. Similarly, messages from the instant messaging server 18 may include a service identifier that cause those messages to be forwarded to the agent 48 in the client 12. Likewise, messages from the data management session control server 21 may have appropriate identifiers that cause them to be shunted to the data management session control agent 45 on the client 12.

The server 10 may include a storage 25 that stores software 134, 70 and 102 for controlling the operation of the server 22. Likewise, the server 38 on the client 12 may be coupled to a storage 43 that stores software 50, 82 and 114 that controls the operation of the server 38. The servers 22 and 38 may also be processor-based systems.

Figure 2:
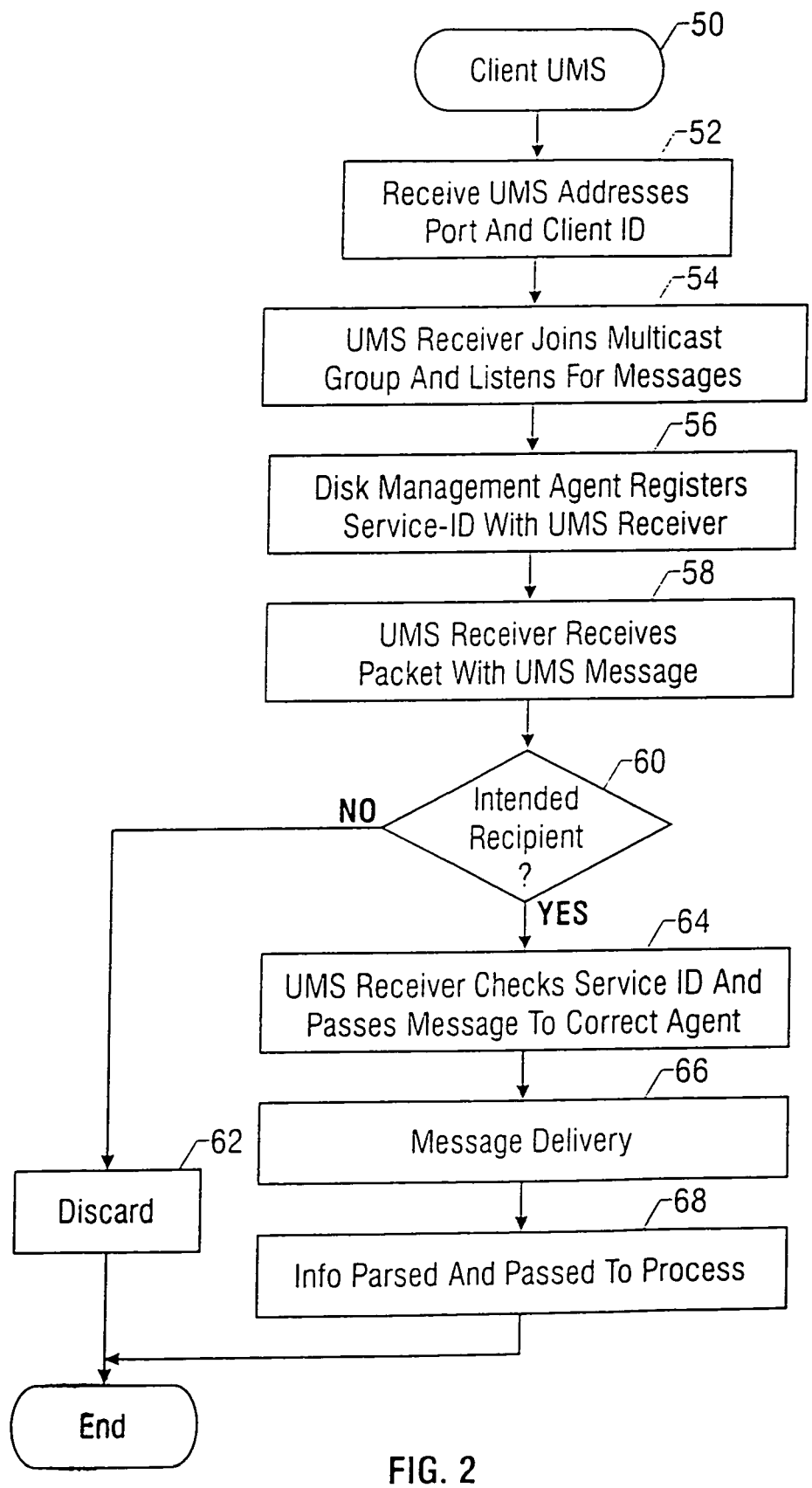
FIG. 2 is a flow chart for software resident on the client shown in FIG. 1 in accordance with one embodiment of the present invention.

Turning next to FIG. 2, the software 50 on the client 12 initially receives the unidirectional messaging server address and port from the server 10. The client 12 may also be assigned a client identifier as indicated in block 52. Thus, an Internet Protocol multicast system may be established wherein each client has a UMS address and port as well as a unique client identifier, assigned by the server 10. In some embodiments, the server 10 may dynamically adjust addresses and ports as well as client identifiers to enable communication of particular messages, message groups or types of messages to particular clients in a dynamic and reconfigurable fashion.

Having received its address, port and client identifier, the client 12 receiver joins a multicast group and listens for messages addressed specifically to it or to any groups that the client 12 belongs to, as indicated in block 54.

A disk management agent 44 registers its service identifier with the UMS server 38 as indicated in block 56. When the UMS server 38 receives a packet with a UMS message, as indicated in block 58, a check determines whether the particular client 12 is the intended recipient as indicated in diamond 60. If not, the message is discarded as indicated in block 62.

However, if the particular client 12 is the intended recipient, the server 38 checks the message's service identifier and passes the message to the correct agent 44, 46 or 48, as indicated in block 64. The message is then delivered to the appropriate agent 44 as indicated in block 66. In the agent 44, the information is parsed and passed to an appropriate process for handling as indicated in block 68.

For example, when addressed, the disk management agent 44 sends appropriate commands to the controller 47 for relay to the storage device 43. Dependent on the service identifier accompanying the message, the agent 44 may provide appropriately translated commands to the controller 47 such as the commands to create a partition, delete a partition or modify a partition. Each of these commands may be given separate service identifier values such as 0x03, 0x04 and 0x05. The disk management agent 44 may translate a message with a service identifier value into an appropriate format for the controller 47 based on the message received from the client disk management server 20. For example, with a message that includes a service identifier value 0x03, the agent 44 may issue a command to the controller 47 to partition the storage 43.

Figure 3:
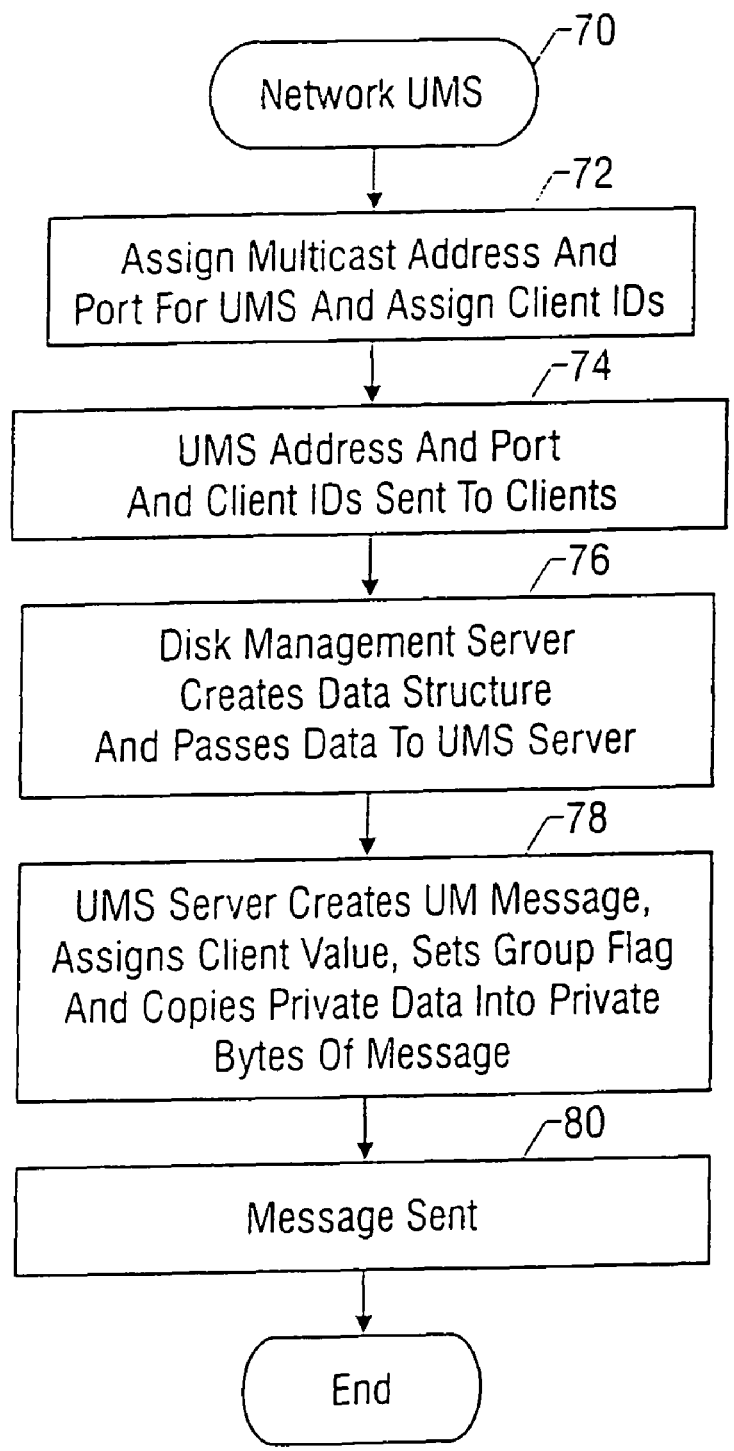
FIG. 3 is a flow chart for software resident on the server or head-end in accordance with one embodiment of the present invention.

On the server side, shown in FIG. 3, the network software 70 begins by assigning multicast addresses and ports for unidirectional messaging service to a plurality of clients 12 as indicated in block 72. The server 10 may also assign client identifiers in a dynamic and reconfigurable fashion. The address, port and client identifiers are then transmitted to the clients as indicated in block 74.

Thereafter, the disk management server 20 may create a data structure and pass this data structure to the server 22 as indicated in block 76. The server 22 creates a unidirectional message and assigns a client value, sets a group flag, and copies private data in the private bytes of the message as indicated in block 78. More particularly, a unique client identifier may be assigned. The client identifier may either be a particular preassigned client identifier or, as one example, may be zero when multiple clients are targeted. A group flag may be a Boolean value specifying whether the client identifier is a group mask or a particular identifier. A group mask is an identifier that identifies a subset of the clients 12 on the network. This subset may include a plurality of clients but less than the total number of addressable clients.

As one example of a undirectional message header, the message may include a number of variables including a group_mask, a service_id, a version_id, a message_id, and a private_data_byte. The group_mask may, in one embodiment of the present invention, include 64 bits, the service_id may include eight bits, the version_id may include sixteen bits, the message_id may include eight bits and the private_data_byte may include eight bits. The version_id is the version of the unidirectional messaging protocol and may initially be set to zero. The service_id may be a service identifier that may be as one example 0x02 for an instant messaging service. Advantageously, the message size does not exceed 1,024 bytes in order to eliminate potential datagram fragmentation. The group_filter may be used in conjunction with the client_id field to limit the size of the private data bytes required for an application. Each of header items may include an unsigned integer most significant bit first (uimsbf) identifier in accordance with the DVB specification except for the private_data_byte which may include a bit string, left bit first (bslbf) identifier.

As indicated in block 80, the message is then sent to all the clients 12 on the network. Each client then determines whether the message is intended for that client. The client 12 determines whether it is the specific intended recipient by determining whether the message is addressed to the client identifier of the client 12. For example, using an AND logic operator between the message's identifier and the client's identifier, the client 12 may determine if the client 12 is within a group of clients jointly addressed by the server 10.

In one embodiment of the present invention, distinct groups of users may receive common client identifier elements. Thus, a plurality of clients whose owners have signed up for enhanced service may include a common code portion in their client identifier. When a message including that common code portion in the client identifier is received, each of those clients accepts the message. Likewise, clients in particular geographic areas, having particular interests or otherwise identifiable clients may be given unique prefixes/suffixes or identifier code portions. The code portion may be logically ANDed with a group_mask to determine whether a particular client is a member of the targeted group.

The management message header may also include fields to address the disk management agent 44, such as a volume_name_len field that provides the volume, name, length and bytes for the pertinent volume of a storage device 45 in the form of a hard disk drive. In one embodiment of the present invention, that field may be eight bits long and may be have a bslbf identifier. In addition, a volume_name_byte field may give the volume name bytes that make up the name of the volume to mount on which to create a partition. In one embodiment of the present invention, this field may be eight bits long and may include a bslbf identifier. Finally, a partition_size field may give the size of the partition to create in bytes. This field may be thirty-two bits in size and may use the uimsbf identifier. Of course, additional fields and additional service identifiers may be utilized to implement still additional commands to the client storage device 45.

In this way, the client disk management server 20, under the direction from the server or head-end 10, may control how the storage 43 is set up and utilized on a targeted client 12 or a targeted group of clients 12. Each of the clients 12 may be individually addressed, the entire set of clients may be addressed or any subgroup of clients may be collectively addressed such that their storage devices 45 may be individually or collectively modified. Thus, the storage devices 43 of one or more clients may be selectively controlled from the server 10.

Figure 4:
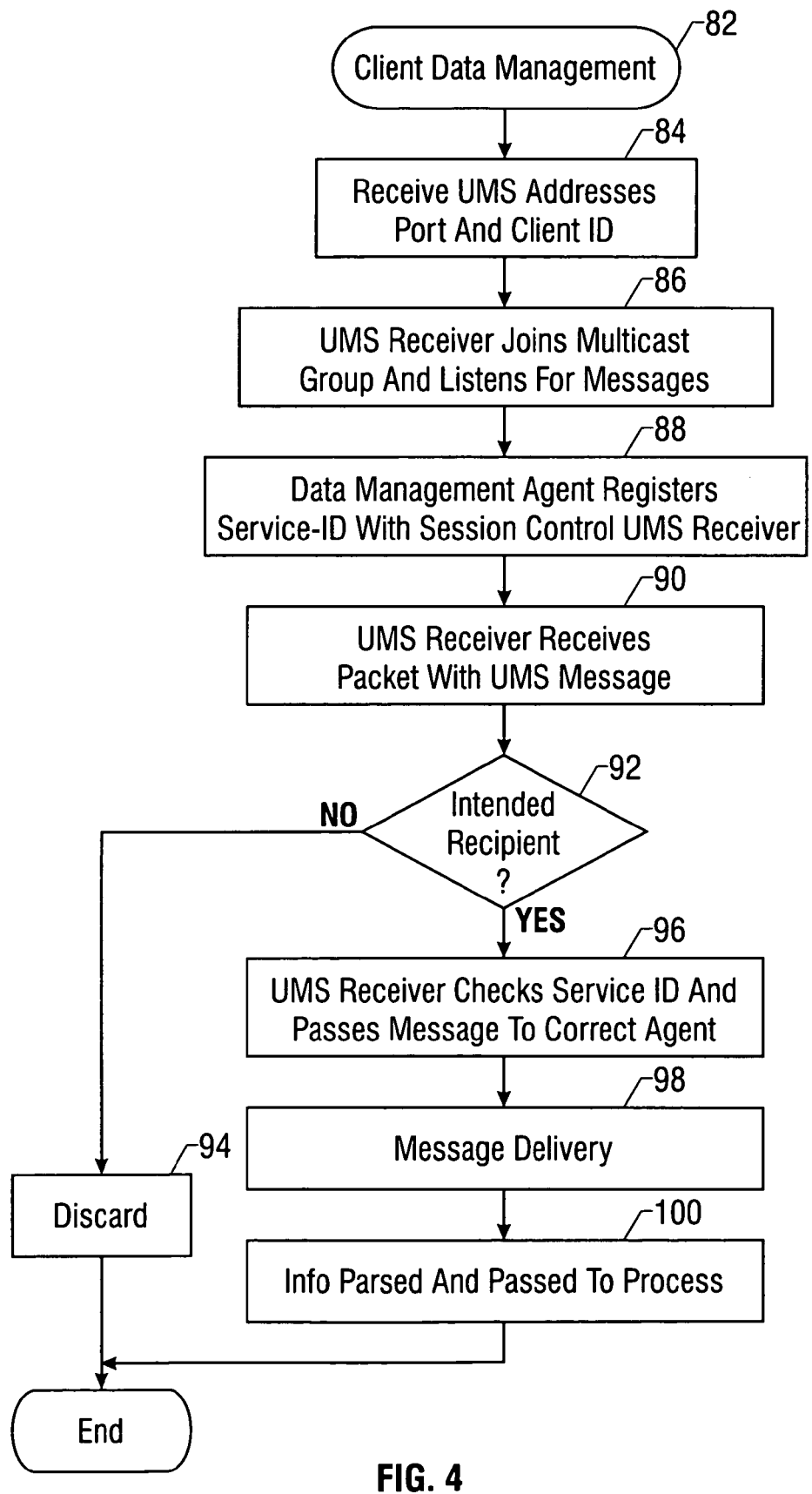
FIG. 4 is a flow chart for software resident on the client shown in FIG. 1 in accordance with another embodiment of the present invention.

Referring to FIG. 4, the software 82 on the client 12 for implementing a network management session, initially receives the unidirectional messaging server address and port from the server 10. The client 12 may also be assigned a client identifier as indicated in block 84. Thus, an Internet Protocol multicast system may be established wherein each client has a UMS address and port as well as a unique client identifier, assigned by the server 10.

Having receives its address, port and client identifier, the client 12 receiver joins a multicast group and listens for messages addressed specifically to it or to any groups that the client 12 belongs to, as indicated in block 86.

A data management session control agent 45 registered its service identifier with the UMS server 38 as indicated in block 88. When the UMS server 38 receives a packet with a UMS message, as indicated in block 90, a check determines whether the particular client 12 is the intended recipient as indicated in diamond 92. If not, the message is discarded as indicated in block 94.

However, if the particular client 12 is the intended recipient, the server 38 checks the message's server identifier and passes the message to the correct agent 45, as indicated in block 64. The message is then delivered to the appropriate agent 45, as indicated in block 98. In the agent 45, the information is parsed and passed to an appropriate process for handling as indicated in block 100. The data management session control agent 45 receives a targeted message from the data management session control server 21 and in response thereto provides the data requested by the server 21, for example over a back channel 47. Thus, in one embodiment, the agent 45 may receive messages having a particular syntax including a ManagementMessage( ) which includes a group_mask, a service_id, a version_id, a message_id, a message_byte_count, and a DMSessionControlMessage( ) that in turn includes a session_id, a session host name, a session_start_time, a session_duration and a data_id.

The session_id is a unique session identifier. The server_host_name is a string host name of the data management server to establish a connection. The session_start_time is a date and time for the client 12 to establish the session. The session_duration is the duration after start time that the server 21 will accept the session and provides a time window if necessary. The data_id is a unique identifier of information or data set to exchange during the session. The method for managing and assigning information and/or data of the identifier is application private.

Thus, the server 21 can initiate a message to the client 12 which causes the client 12 to initiate an uploading of specified data at a specified time. That is, the server 21 may specify a header including a session_id, a server_host_name, a session_start_time, a session_duration, and a data_id, and in response thereto the data management session control agent 45 gathers the requested information and provides it in the requested form at the requested time.

The server 21 may provide messages with different message identifiers including a session create message, a session delete message and session update message, as examples. The session delete message simply deletes a previously created session and the session update message causes additional information to be provided for a scheduled session.

In one embodiment of the present invention, the group_mask may include 64 bits with the uimsbf identifier. The session_id may include eight bits with a uimsbf identifier. The version_id may include sixteen bits with a uimsbf identifier. The message_id may include eight bits and have an identifier of 0x01. The message_byte_count may include sixteen bits within a uimsbf identifier. The DataManagementSessionControlMessage( ) may include the syntax session_id with eight bits, session_start_time with sixty-four bits, session_duration with thirty-two bits, and data_id with thirty-two bits in one embodiment, all in the uimsbf identifier format.

The DataManagementSessionControlMessage( ) may also include a server_host_name with one hundred twenty-eight bits with a bslbf identifier.

Figure 5:
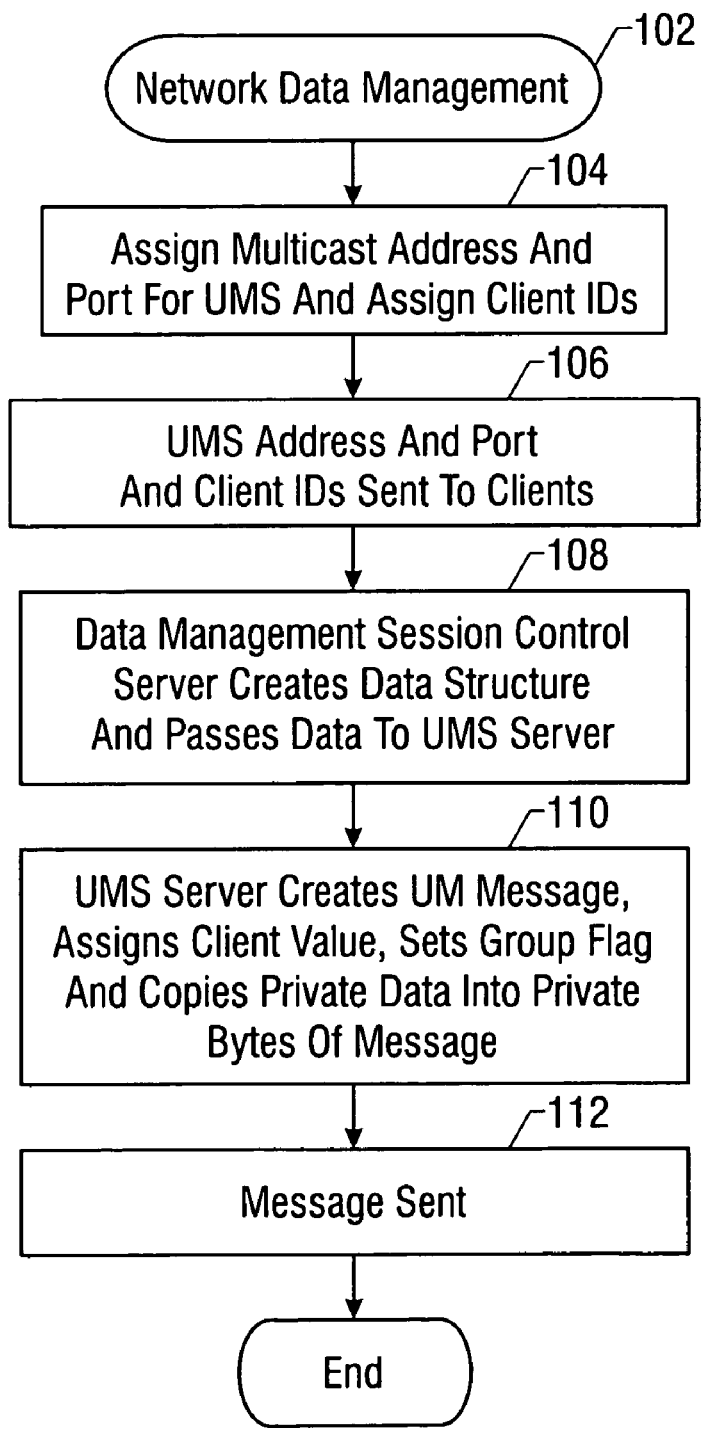
FIG. 5 is a flow chart for software resident on the server or head end in accordance with another embodiment of the present invention.

On the server side, shown in FIG. 5, the network software 102 begins by assigning multicast addresses and ports for unidirectional messaging service to a plurality of clients 12 as indicated in block 104. The server 10 may also assign client identifiers in a dynamic and reconfigurable fashion. The address, port and client identifiers are then transmitted to the clients as indicated in block 106.

Thereafter, the data management session control server 21 may create a data structure and pass this data structure to the server 22 as indicated in block 108. The server 22 creates a unidirectional message and assigns a client value, sets a group flag, and copies private data in the private bytes of the message as indicated in block 110. More particularly, a unique client identifier may be assigned. The client identifier may either be a particular preassigned client identifier, or as one example, may be zero when multiple clients are targeted. A group flag may be a Boolean value specifying whether the client identifier is a group mask or a particular identifier. A group mask is an identifier that identifies a subset of the clients 12 on the network. This subset may include a plurality of clients 12 but less than the total number of addressable clients.

As indicated in block 112, the message is then sent to all the clients 12 on the network. Each client then determines whether the message is intended for that client. The client 12 determines whether it is the specific intended recipient by determining whether the message is addressed to the client identifier for the client 12. For example, using an AND logic operator between the message's identifier and the client's identifier, the client 12 may determine if the client 12 is within a group of clients jointly addressed by the server 10.

The network management command and control server 16 works with the network session management agent 48. When a message generated at the instance of the server 16 is directed to the agent 48, the agent 48 calls the session manager 49. The session manager may provide the desired management information in a predetermined format over a back channel 43 in one embodiment of the present invention.

Figure 6:
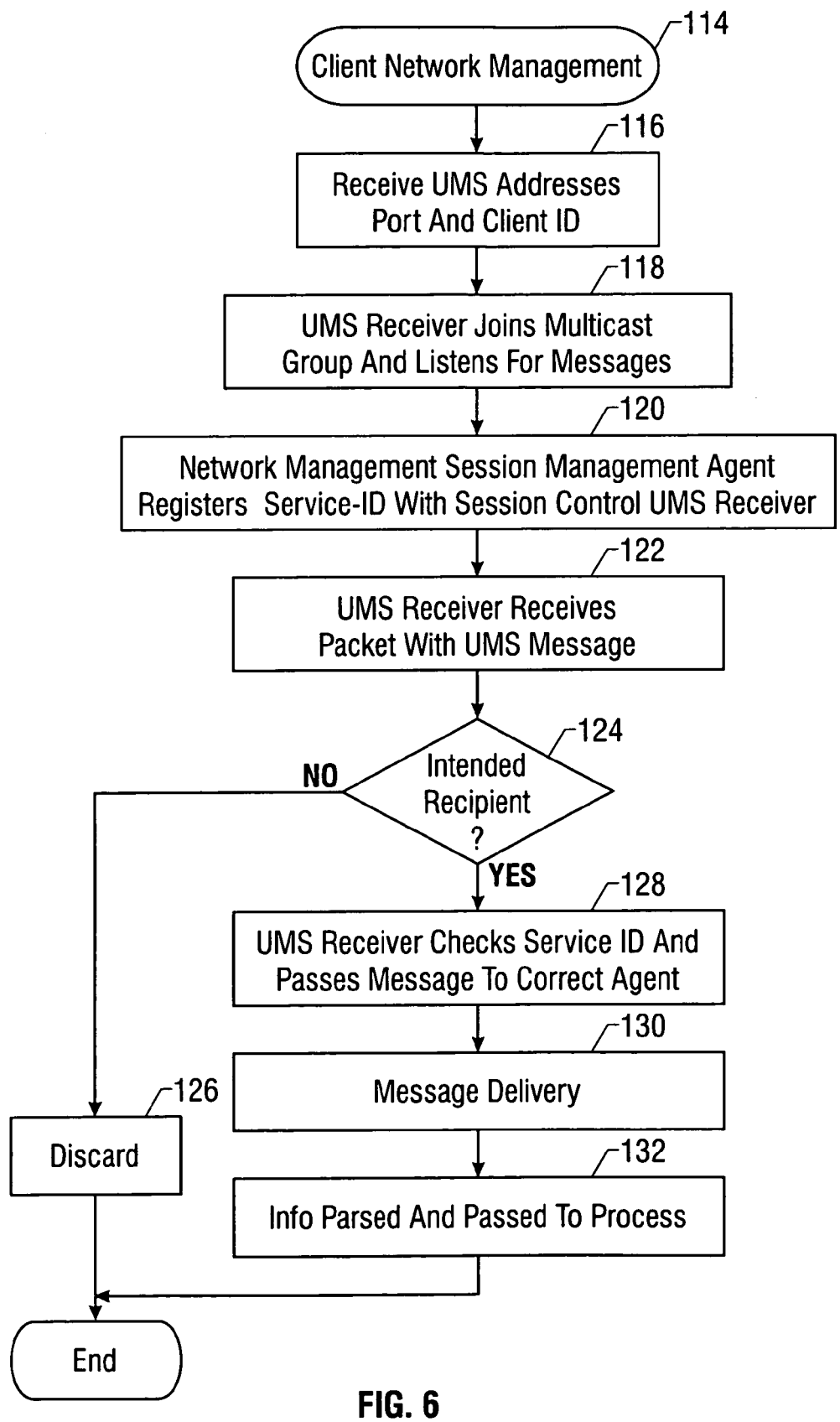
FIG. 6 is a flow chart for software resident on the client shown in FIG. 1 in accordance with another embodiment of the present invention.

The network management sessions are generally for the purposes of uploading network management information to the server 16. As one example, a management information base (MIB) may be uploaded over a simple network management protocol (SNMP) over the return channel 43. The operation of the agent 48, shown in FIG. 6, generally corresponds to that described previously with respect to the agents 44 and 45. That is, the UMS addresses, port and client identifiers are received, as indicated in block 116, the receiver joins the multicast group and listens for messages as indicated in block 118 and the network session management agent 48 registers its service identifier with the UMS receiver as indicated in block 120. The UMS receiver then receives the package with the message as indicated in block 122.

A check at diamond 124 determines whether the particular agent 48 is the intended recipient. If not, the message is discarded as indicated in block 126. Otherwise, the receiver checks the service identifier and passes the message to the agent 48, as indicated in block 130. The information is parsed and passed to the session manager 49. The session manager 49 then schedules the session, using the channel 43, with the server 16.

The message format is basically the same as the format used by the DMSC. However, instead of having DMSession-ControlMessage( ) an NMSessionControlMessage( ) includes an info_ID field. The info_ID field is a unique identifier of information or a data set to exchange during the session. The method of managing and assigning the information and/or data set identifier is application private. For example, a specific SNMP client MIB may be identified to upload to the server, if the client manages multiple MIBs.

An MIB is information on an agent that is known as the management information base. This information forms a basis for event reporting. The standards for MIBs are set forth for example in RFC 1229 distributed by the Network Working Group (May 1991).

Figure 7:
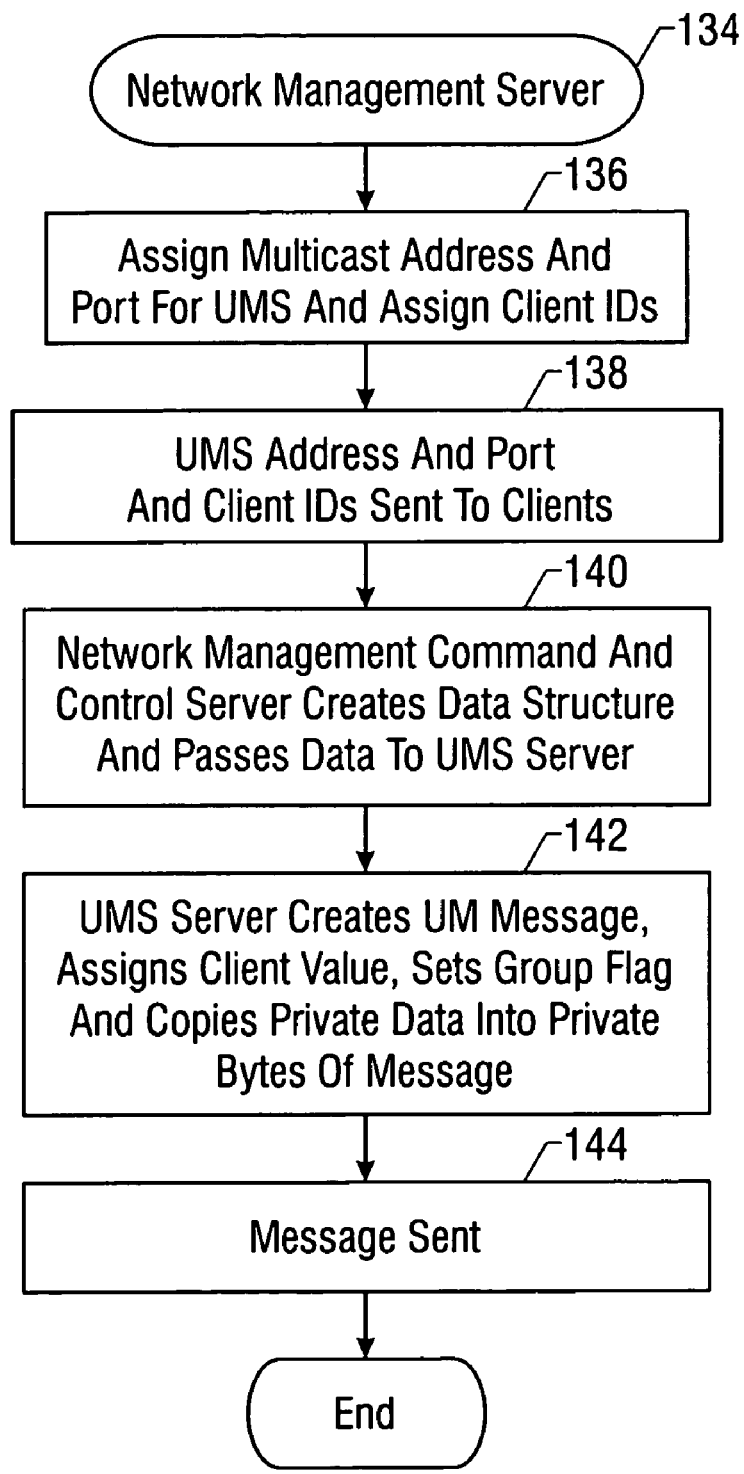
FIG. 7 is a flow chart for software resident on the server or head end in accordance with another embodiment of the present invention.

Turning next to FIG. 7, the operation of the network management server 16, utilizing the software 134, corresponds generally to that described previously. Again, the multicast address and port for UMS is assigned and the client identifiers are assigned as indicated in block 136, the UMS address and port and client identifier are sent to the clients as indicated in block 138, and the network management command and control server 16 creates a data structure and passes the data to the UMS server as indicated in block 140. The UMS server 22 then creates the UM message, assigns a client value, sets a group flag and copies private data into private bytes of the message as indicated in block 142. Thereafter, the message is sent (block 144).

Then at the predetermined time, the server 16 receives the scheduling information from the session manager 49. At the appropriate time, a session may be provided in which the MIBs or other information is uploaded to the server 16 via the actions of the agent 48 and session manager 49.

In one embodiment of the present invention, distinct groups of users may receive common client identifier elements. Thus, a plurality of clients whose owners have signed up for enhanced service may include a common code portion in their client identifier. When a message including that common code portion in the client identifier is received, each of those clients accepts the message.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving on a client a message from a server addressed to said client;
   scheduling a data upload session based on said message; and
   extracting from said message an identifier which specifies the information to upload to said server and uploading the specified information to said server.

2. The method of claim 1 wherein said message includes a server identifier, and uploading said data to the identified server.

3. An article comprising a medium storing instructions that enable a processor-based system to:
   receive a message from a server addressed to said system;
   schedule uploading of information from said system to said server based on said message; and
   extract from said message an identifier which specifies the information to upload to said server and upload the specified information to said server.

4. The article of claim 3 further storing instructions that enable the processor-based system to upload said data to a server identified in said message.

* * * * *